United States Patent
Hwang et al.

(10) Patent No.: US 10,786,867 B2
(45) Date of Patent: Sep. 29, 2020

(54) GDL CUTTING SYSTEM OF FUEL CELL AND CUTTING METHOD

(71) Applicant: KIA MOTORS CORPORATION, Seoul (KR)

(72) Inventors: Sunha Hwang, Uijeongbu-si (KR); Sun Ho Lee, Seoul (KR)

(73) Assignee: KIA MOTORS CORPORATION, Seoul (KR)

(*) Notice: Subject to any disclaimer, the term of this patent is extended or adjusted under 35 U.S.C. 154(b) by 565 days.

(21) Appl. No.: 15/259,317

(22) Filed: Sep. 8, 2016

(65) Prior Publication Data
US 2017/0252863 A1    Sep. 7, 2017

(30) Foreign Application Priority Data
Mar. 4, 2016   (KR) .......................... 10-2016-0026659

(51) Int. Cl.
*B23K 26/03*    (2006.01)
*B23K 26/142*   (2014.01)
(Continued)

(52) U.S. Cl.
CPC ........ *B23K 26/0846* (2013.01); *B23K 26/032* (2013.01); *B23K 26/142* (2015.10);
(Continued)

(58) Field of Classification Search
CPC .............. B23K 2103/38; B23K 26/032; B23K 26/0846; B23K 26/142; B23K 26/38;
(Continued)

(56) References Cited

U.S. PATENT DOCUMENTS

| 7,910,037 B2* | 3/2011 | Itoh ..................... H01M 8/2483 264/297.8 |
| 8,771,902 B2* | 7/2014 | Kuramochi ........... B32B 37/223 429/535 |

(Continued)

FOREIGN PATENT DOCUMENTS

| JP | 2007-299551 A | 11/2007 |
| KR | 20-1999-0035910 U | 3/2000 |

(Continued)

OTHER PUBLICATIONS

See Yukamura (JP2013256347)—English Translation (Year: 2013).*
(Continued)

*Primary Examiner* — Tu B Hoang
*Assistant Examiner* — Tiffany T Tran
(74) *Attorney, Agent, or Firm* — Morgan, Lewis & Bockius LLP

(57) ABSTRACT

A GDL cutting system of a fuel cell includes: a laser-cutting device that forms a gas diffusion layer by radiating a laser on the surface of a GDL fabric panel moving on a conveyer; an adsorbing-conveying device that adsorbs and conveys at least two gas diffusion layers cut by the laser-cutting device; a first vision sensor that senses an upper side of the gas diffusion layers cut by the laser-cutting device; and a second vision sensor that senses a lower side of the gas diffusion layers adsorbed and conveyed by the adsorbing-conveying device.

6 Claims, 6 Drawing Sheets

(51) Int. Cl.
| | |
|---|---|
| *B23K 26/08* | (2014.01) |
| *H01M 8/023* | (2016.01) |
| *B23K 26/38* | (2014.01) |
| *B23K 26/402* | (2014.01) |
| *B28B 11/12* | (2006.01) |
| *D01D 5/42* | (2006.01) |
| *D01F 9/12* | (2006.01) |
| *H01M 8/0202* | (2016.01) |
| *H01M 8/1004* | (2016.01) |
| *B23K 103/00* | (2006.01) |

(52) U.S. Cl.
CPC ............ *B23K 26/38* (2013.01); *B23K 26/402* (2013.01); *B28B 11/12* (2013.01); *D01D 5/426* (2013.01); *D01F 9/12* (2013.01); *H01M 8/0202* (2013.01); *H01M 8/023* (2013.01); *H01M 8/1004* (2013.01); *B23K 2103/38* (2018.08)

(58) Field of Classification Search
CPC ...... B23K 26/402; B28B 11/12; D01D 5/426; D01F 9/12; H01M 8/0202; H01M 8/023; H01M 2/1004
USPC ............... 219/121.62, 121.83, 121.68, 121.6, 219/121.18, 121.19, 121.82, 121.39, 219/121.4; 700/90, 108, 109, 110, 114, 700/115, 117
See application file for complete search history.

(56) References Cited

U.S. PATENT DOCUMENTS

| | | | | |
|---|---|---|---|---|
| 2003/0188413 A1* | 10/2003 | Mlinar | ............ | H01M 8/2465 29/411 |
| 2004/0094050 A1* | 5/2004 | Ackley, Jr. | ......... | B23K 26/0838 101/44 |
| 2005/0266974 A1* | 12/2005 | Yamazaki | .......... | B23K 26/1482 483/16 |
| 2012/0079695 A1* | 4/2012 | Lee | ......................... | G01N 35/04 29/33 R |
| 2014/0329167 A1* | 11/2014 | Okanishi | ............. | H01M 8/0234 429/490 |
| 2015/0259168 A1* | 9/2015 | Inoue | ..................... | B65H 19/12 242/553 |
| 2015/0266250 A1* | 9/2015 | Hoffmann | ............... | B29C 53/56 415/200 |
| 2015/0290749 A1* | 10/2015 | Katsuyama | ........ | B23K 37/0408 219/121.39 |
| 2016/0049677 A1* | 2/2016 | Muller | ............... | B23K 11/0026 429/480 |
| 2016/0059419 A1* | 3/2016 | Suzuki | .................. | B25J 9/1697 700/114 |
| 2016/0365599 A1* | 12/2016 | Ju | ........................ | H01M 8/248 |

FOREIGN PATENT DOCUMENTS

| | | |
|---|---|---|
| KR | 10-2010-0036069 A | 4/2010 |
| KR | 10-2013-0027240 A | 3/2013 |
| KR | 10-1262001 B1 | 5/2013 |
| KR | 10-1371496 B1 | 3/2014 |

OTHER PUBLICATIONS

• JP2007299551A (Year: 2006).*
• KR101251229B1 (Year: 2011).*
Korean Notice of Grant issued in corresponding Korean Patent Application No. 10-2016-0026659, dated Jul. 3, 2018, with English Translation.

* cited by examiner

GDL CUTTING SYSTEM OF FUEL CELL AND CUTTING METHOD

CROSS-REFERENCE TO RELATED APPLICATION

This application claims the benefit of priority to Korean Patent Application No. 10-2016-0026659, filed on Mar. 4, 2016 in the Korean Intellectual Property Office, the entirety of which is incorporated herein by reference.

TECHNICAL FIELD

An exemplary embodiment in the present disclosure relates to a fuel cell. More particularly, the present disclosure relates to a gas diffusion layer (GDL) cutting system for a fuel cell that cuts a gas diffusion layer to be attached to a Membrane-Electrode Assembly (MEA) of a fuel cell into a predetermined shape.

BACKGROUND

Fuel cells generate electrical energy using the electrochemical reaction of hydrogen and oxygen. Fuel cells are capable of continuously generating electrical energy by being supplied with chemical reactants from the outside without requiring a specific charging process.

Fuel cells may be implemented by disposing a separator (a separating plate or a bipolar plate) on both sides of a Membrane Electrode Assembly (MEA). Individual fuel cells may be sequentially arranged into a fuel cell stack.

An MEA is an important part of a fuel cell, and may include an anode and a cathode that are electrode catalyst layers on both sides of an electrolyte membrane through which hydrogen ions move. Furthermore, the MEA may include a sub-gasket that protects the electrode catalyst layers and the electrolyte membrane, thereby simplifying the assembly of the fuel cell.

In the manufacturing of such an MEA, an electrode membrane sheet is manufactured in a decal method by unrolling a rolled electrolyte membrane and then sequentially transferring electrode catalyst layers to both sides of the electrolyte membrane to be spaced apart from each other by a predetermined interval (approximately, 150 mm pitch).

Therefore, as a post process, a rolled electrode membrane sheet is unrolled and delivered, the rolled sub-gasket is unrolled and positioned on both sides of the electrode membrane sheet, and the sub-gaskets are bonded to both sides of the electrode membrane sheet by passing them between hot rollers, thereby manufacturing an MEA sheet in a roll-to-roll method.

Furthermore, a fuel cell may be manufactured by bonding an MEA and a gas diffusion layer (GDL) to each other at high temperature and then alternately stacking the bonded assembly and a separating plate.

For example, the GDL may be manufactured into the shape of a film, cut into a predetermined shape, and then bonded to an electrode membrane under pressure, thereby forming an MEA. Herein, the costs and manufacturing time may be increased, depending on the method of manufacturing the gas diffusion layer into the shape of a film and then cutting it into a predetermined shape.

Accordingly, research has been conducted into a GDL cutting system and method for a fuel cell that efficiently cuts a rolled GDL, examines the rolled GDL, and classifies the rolled GDL in accordance with the examination result.

The Description of the Related Art is made to aid in the understanding of the background of the present disclosure and may include matters out of the related art known to those skilled in the art.

SUMMARY

The present disclosure has been made in an effort to provide a GDL cutting system for a fuel cell having advantages of obtaining a gas diffusion layer by cutting a GDL fabric panel, examining it at a low cost, and preventing a poor product.

An exemplary embodiment in the present disclosure provides a GDL cutting system for a fuel cell that includes: a laser-cutting device that forms gas diffusion layers by radiating a laser on the surface of a GDL fabric panel moving on a conveyer; an adsorbing-conveying device that adsorbs and conveys at least two gas diffusion layers cut by the laser-cutting device; a first vision sensor that senses the upper sides of the gas diffusion layers cut by the laser-cutting device; and a second vision sensor that senses the lower sides of the gas diffusion layers adsorbed and conveyed by the adsorbing-conveying device.

The system may further include a scrap basket disposed at an exit of the conveyer and collecting scraps of the gas diffusion layers separated from the GDL fabric panel.

The system may further include a controller that determines normality and abnormality of the cut gas diffusion layers on the basis of image signals transmitted from the first vision sensor and the second vision sensor.

The system may further include: a normal product magazine in which normal products of the gas diffusion layers are loaded; a poor product magazine in which abnormal products of the gas diffusion layers are loaded; and a stationery magazine in which stationery to be inserted between the gas diffusion layers is loaded.

The adsorbing-conveying device may move a predetermined distance with the GDL fabric panel at the same speed on the conveyer with an adsorbing surface of the adsorbing-conveying device in contact with the upper surfaces of the gas diffusion layers, and the adsorbing-conveying device may separate the cut gas diffusion layers from the GDL fabric panel by moving up.

The system may further include: a fabric panel unwinder on which the GDL fabric panel is rolled and that is disposed ahead of the conveyer; a feeding device that continuously supplies the GDL fabric panel rolled on the fabric panel unwinder to an inlet of the conveyer by pulling the GDL fabric panel; and a fabric panel-connecting device that is disposed between the fabric panel unwinder and the feeding device, and fixes and connects a new GDL fabric panel and a previous GDL fabric panel, respectively.

The fabric panel-connecting device may include: a first holder that is disposed to hold the rear end of the previous GDL fabric panel; a second holder that is disposed to hold the front end of the new GDL fabric panel; and holder actuators that operate the first and second holders so that the first and second holders fix the previous GDL fabric panel and the new GDL fabric panel.

The system may further include: a dirt pan that is disposed to collect dirt dropping under the conveyer from the GDL fabric panel; and a particle suction device that is disposed at the exit of the conveyer, and sucks and filters granular dirt in the air.

The laser-cutting device may include: a laser head including a laser that radiates in a predetermined shape; and an air-spraying nozzle disposed to one side of the laser head and removing dirt by spraying air on the surface of the GDL fabric panel.

Another exemplary embodiment in the present disclosure provides a GDL cutting method of a fuel cell that may include: supplying a GDL fabric panel to an inlet of a conveyer; forming the gas diffusion layer by cutting the GDL fabric panel by radiating a laser on the GDL fabric panel moving on the conveyer; and performing visual examination on the upper and lower sides of the gas diffusion layer while the gas diffusion layer is being moved.

The method may further include collecting scraps of the gas diffusion layers separated from the GDL fabric panel.

In the cutting of the gas diffusion layers by radiating a laser, dirt attached on the GDL fabric panel may be removed by spraying air.

Normal gas diffusion layers and abnormal gas diffusion layers may be divided and loaded on the basis of the examination result.

The method may further include sucking and filtering granular dirt at an exit of the conveyer.

According to an exemplary embodiment in the present disclosure, it is possible to continuously supply GDL fabric panels and effectively cut gas diffusion layers using a laser.

Further, it is possible to effectively sense normal products and poor products by performing vision examination on both sides of gas diffusion layers after cutting, and to prevent the poor products from being used in the following processes by separating and loading them.

Further, it is possible to automate the process of cutting gas diffusion layers from the GDL fabric panel, so productivity can be improved and the standard of quality examination can be effectively improved.

BRIEF DESCRIPTION OF THE DRAWINGS

The drawings are provided for reference in describing exemplary embodiments in the present disclosure, but the spirit of the present invention should not be construed only by the accompanying drawings.

DETAILED DESCRIPTION OF THE EMBODIMENTS

Figure 1:
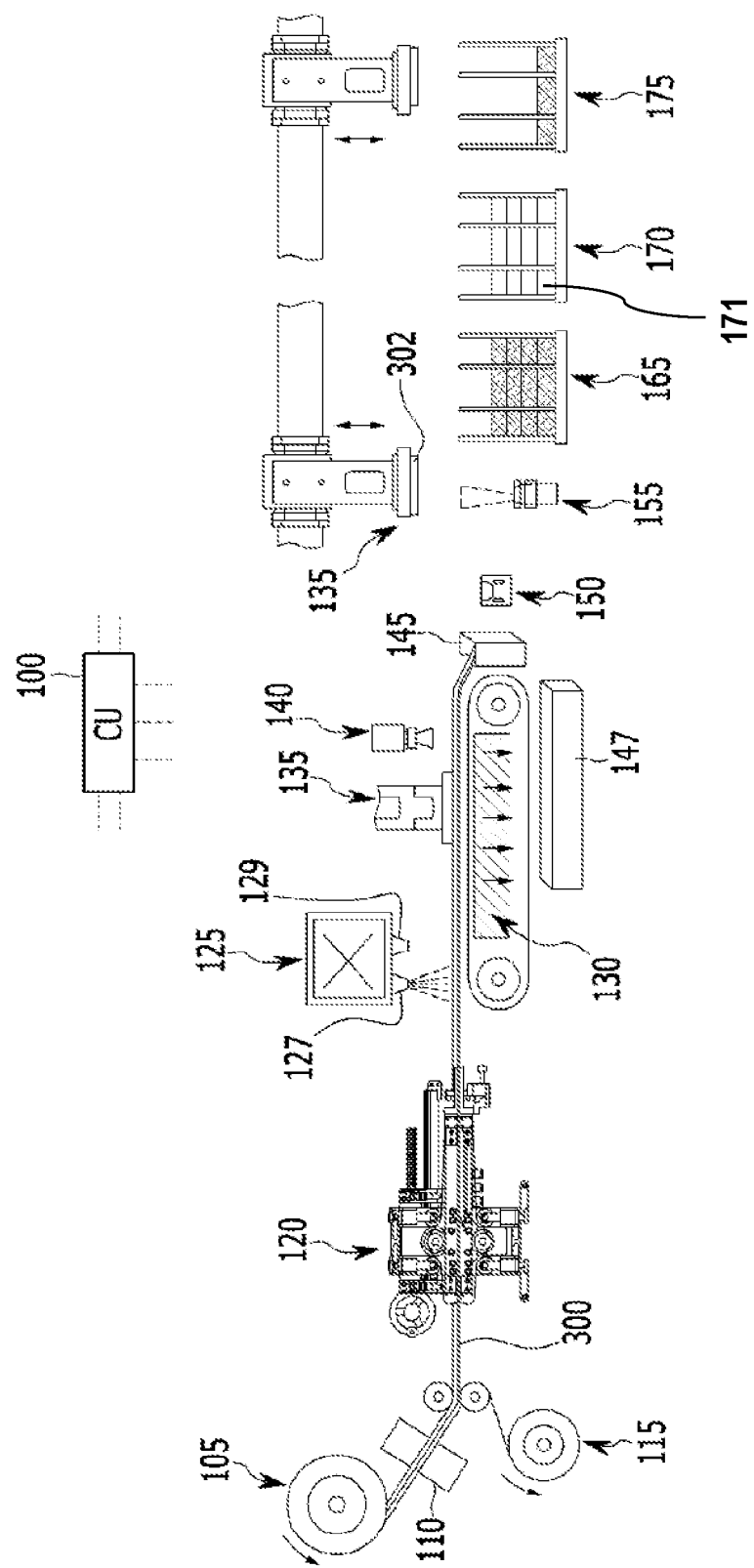
FIG. 1 is a schematic diagram of a GDL cutting system for a fuel cell according to an exemplary embodiment in the present disclosure.

Hereinafter, the present disclosure will be described more fully hereinafter with reference to the accompanying drawings, in which exemplary embodiments are shown. As those skilled in the art would realize, the described embodiments may be modified in various different ways, all without departing from the spirit or scope of the present invention.

The parts not related to the description of the exemplary embodiments are not shown to make the description clear and like reference numerals designate like elements throughout the specification.

Further, the sizes and thicknesses of the configurations shown in the drawings are provided selectively for the convenience of description, so that the present invention is not limited to those shown in the drawings and the thicknesses are exaggerated to make some parts and regions clear.

Distinguishing the names of components with the first, and the second, etc. in the following description is for distinguishing them for the same relationship of the components and the components are not limited to the order in the following description.

Throughout the specification, unless explicitly described to the contrary, the word "comprise" and variations such as "comprises" or "comprising", will be understood to imply the inclusion of stated elements but not the exclusion of any other elements.

FIG. 1 is a schematic diagram of a GDL cutting system for a fuel cell according to an exemplary embodiment.

Referring to FIG. 1, a GDL cutting system includes a fabric panel unwinder 105, a fabric panel-connecting device 110, a stationery winder 115, a GDL fabric panel (or a GDL material) 300, a feeding device 120, a laser-cutting device 125, a laser-radiating head 129, an air-spraying nozzle 127, a conveyer 130, a dirt pan 147, a scrap basket 145, a particle suction device 150, an adsorbing-conveying device 135, a first vision sensor 140, a second vision sensor 155, a normal product magazine 165, a stationery magazine 170, a abnormal product magazine 175, and a controller 100.

The GDL fabric panel 300 is rolled on the fabric panel unwinder 105, the feeding device 120 pulls and supplies the rolled GDL fabric panel 300 to the conveyer 130 at a predetermined speed, and the stationery winder 115 pulls and removes stationery attached to a side of the GDL fabric panel 300.

The conveyer 130 is operated by a specific driving unit to move the GDL fabric panel 300 to the exit at a predetermined speed, and the laser-cutting device 125 forms cutting units 400 by radiating a laser to the GDL fabric panel 300 moving along the conveyer 130 using the laser-radiating head 129, thereby forming gas diffusion layers 302 in a predetermined shape from the GDL fabric panel 300.

The air-spraying nozzle 127 removes dirt attached on the surface of the GDL fabric panel 300 by spraying air to the surface of the GDL fabric panel 300 and the dirt drops on and accumulates in the dirt pan 147 under the GDL fabric panel 300.

The adsorbing-conveying device 135 is attached to the surface of the GDL fabric panel 300 and moved in the conveying direction of the GDL fabric panel 300 behind the laser-cutting device 125, whereby it prevents the scrap and the gas diffusion layer 302 cut from the GDL fabric panel 300 from being wrinkled.

A plurality of adsorbing-conveying devices 135 is provided to prevent the scrap and the gas diffusion layer 302 cut from the GDL fabric panel 300 from being wrinkled on the conveyer 130, and adsorb and move the gas diffusion layer 302 from the GDL fabric panel 300.

The scrap basket 145 is disposed at the exit of the conveyer 130 and collects scraps of the gas diffusion layer 302 separated, and the particle suction device 150 sucks and filters granular dirt.

The first vision sensor 140 senses the shapes of the upper sides (or the upper surfaces) of gas diffusion layers 302 remaining in the GDL fabric panel 300 moving along the conveyer 130 and the second vision sensor 155 senses the shape of the lower sides (or the lower surfaces) of the gas diffusion layers 302 conveyed by the adsorbing-conveying device 135.

Further, the first vision sensor 140 and the second vision sensor 155 transmit sensing data to the controller 100 and the controller 100 divides abnormal and normal products by controlling the adsorbing-conveying device 135.

Normal product is loaded in the normal product magazine 165, stationery 171 is loaded in the stationery magazine 170, and the adsorbing-conveying device 135 inserts stationery 171 between gas diffusion layers 302. Further, poor abnormal products are loaded in the poor abnormal product magazine 175.

In an exemplary embodiment in the present disclosure, the first and second vision sensors 140 and 155 can sense contamination of a surface, detect particles of a predetermined size (0.4 mm) or more, and sense the applied state of carbon slurry, breakage of a cut surface, and the dimensions and positions of cutting sheet.

Further, the laser radiated from the laser-radiating head 129, which is a FIBER type, has capacity of 50 W and can perform optimal cutting at 20 Khz, 30 W, and 1064 nm.

Figure 2:
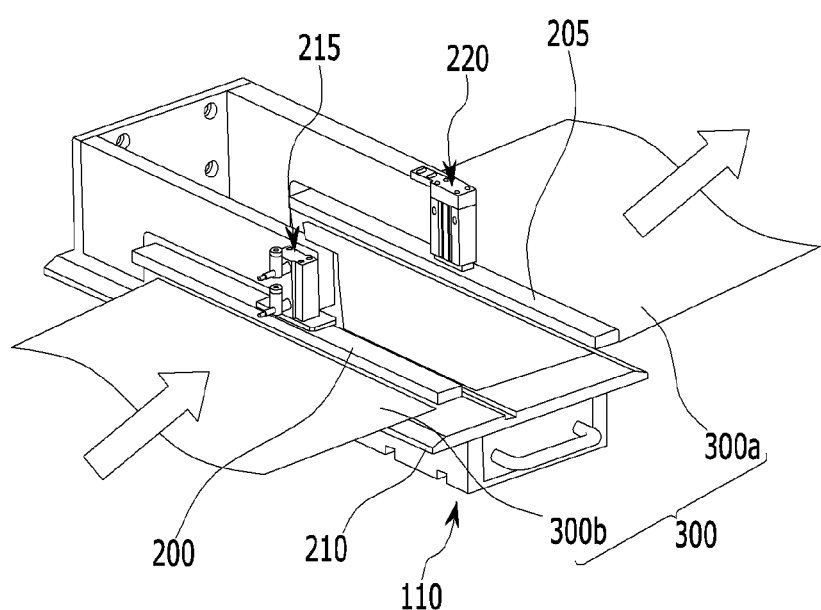
FIG. 2 is a perspective view showing a fabric panel-connecting device according to an exemplary embodiment.

FIG. 2 is a perspective view showing a fabric panel-connecting device according to an exemplary embodiment.

Referring to FIG. 2, the fabric panel-connecting device 110 includes a die 210, a first holder 200, a second holder 205, a first holder actuator 215, and a second holder actuator 220.

With the feeding belt 305 stopped, the first holder 200 is operated by the first holder actuator 215 to hold the front end of a new GDL fabric panel 300b supplied from the fabric panel unwinder 105 over the die 210 and the second holder 205 is operated by the second holder actuator 220 to hold the rear end of the previous GDL fabric panel 300a supplied to the feeding device 120 over the die 210.

A worker bonds the new GDL fabric panel 300b held by the first holder 200 and the previous GDL fabric panel 300a held by the second holder 205 to connect to each other and operates the feeding device 120 so that the new GDL fabric panel 300b is supplied to the conveyer 130.

In an exemplary embodiment in the present disclosure, it is possible to reduce waste of GDL fabric panels 300 and more effectively connect GDL fabric panels 300 through the fabric panel-connecting device 110, thereby improving work efficiency.

Figure 3:
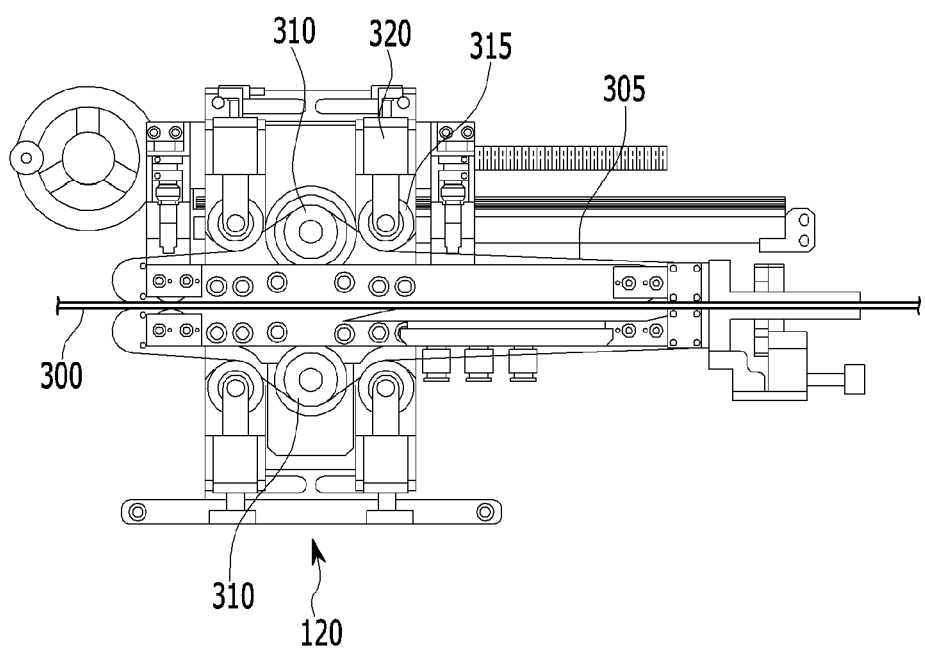
FIG. 3 is a front view of a feeding device according to an exemplary embodiment.

FIG. 3 is a front view of a feeding device according to an exemplary embodiment.

Referring to FIG. 3, the feeding device 120 includes feeding belts 305 that come into contact with the lower surface and the upper surface of the GDL fabric panel 300, respectively, driving rollers 315 moving the feeding belts 305, and guide rollers 315 and pressing units 320 that keep the feeding belts 305 tight.

In an exemplary embodiment, the feeding device 120 can stably control the supply speed of the GDL fabric panel 300 by controlling the moving speed of the feeding belts 305 through the driving rollers 310.

Figure 4:
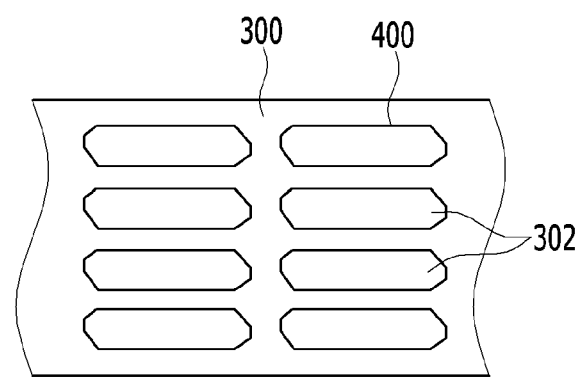
FIG. 4 is a top plan view showing cutting units cut by a laser from a GDL fabric panel according to an exemplary embodiment.

FIG. 4 is a plan view showing cutting units cut by a laser in a GDL fabric panel according to an exemplary embodiment.

Referring to FIG. 4, cutting portions 400 are formed in the GDL fabric panel 300 by the laser irradiated from the laser-radiating head 129. Cut-off portions cut along the cutting units 400 are used as the gas diffusion layers 302.

As shown in the figure, four gas diffusion layers 302 are arranged with a predetermined gap (for example, 8 mm) in the width direction of the GDL fabric panel 300. Further, the gas diffusion layers 302 are arranged with a predetermined gap (for example, 10 mm) in the longitudinal direction of the GDL fabric panel 300.

Figure 5:
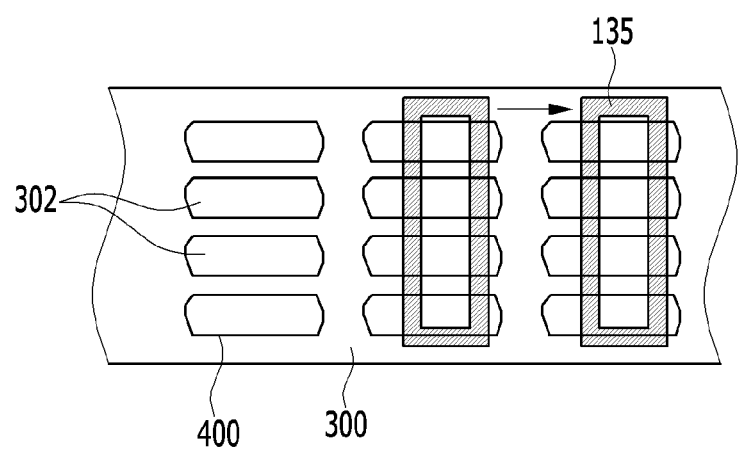
FIG. 5 is a top plan view showing that a GDL fabric panel having cutting units according to an exemplary embodiment to which an adsorbing portion of an adsorbing-conveying device is attached is moved together.

FIG. 5 is a top plan view showing a GDL fabric panel having cut-off portions according to an exemplary embodiment to which an adsorbing portion of an adsorbing-conveying device 135 is attached is moved together.

Referring to FIG. 5, the adsorbing-conveying device 135 is attached to the gas diffusion layers 302 cut along the cutting units 400 in the GDL fabric panel 300 and moved in the moving direction of the GDL fabric panel 300 together.

Accordingly, the gas diffusion layers 302 are prevented from being wrinkled and the gas diffusion layers 302 and the scraps can be stably conveyed on the conveyer 130.

Figure 6:
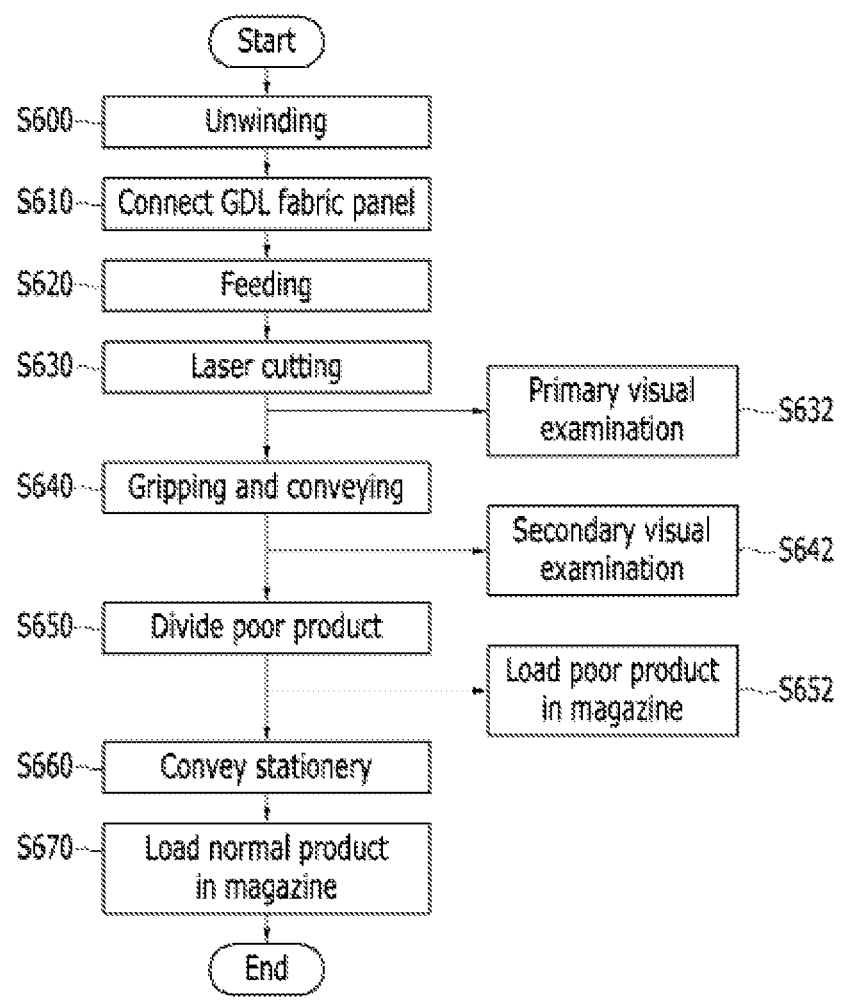
FIG. 6 is a flowchart illustrating a method of cutting a GDL of a fuel cell according to an exemplary embodiment.

FIG. 6 is a flowchart illustrating a method of cutting a GDL of a fuel cell according to an exemplary embodiment in the present disclosure.

Referring to FIG. 6, when control is started, a GDL fabric panel 300 rolled on the fabric panel unwinder 105 is unrolled in step S600, and the previous GDL fabric panel 300a and a new GDL fabric panel 300b are connected by the fabric panel-connecting device 110 in step S610. The GDL fabric panel 300 is supplied to the conveyer by the feeding device 120 and the conveyer 130 conveys the GDL fabric panel 300 to the exit at a predetermined speed in step S620.

In step S630, the laser-cutting device 125 forms gas diffusion layers 302 along the cutting units 400 by radiating a laser on the GDL fabric panel 300 at a predetermined speed with a predetermined intensity in a predetermined shape. In step S632, the first vision sensor 140 senses the upper surfaces of the gas diffusion layers 302 and transmits sensing data to the controller 100.

In step S640, the adsorbing-conveying device 135 adsorbs the cut gas diffusion layers 302 and moves with the GDL fabric panel 300, and separates and conveys the gas diffusion layers 302 from the GDL fabric panel 300 by moving up to a predetermined position. In step S642, the second vision sensor 155 senses the lower surfaces of the gas diffusion layers 302 and transmits sensing data to the controller 100.

In step S650, the controller 100 divides the gas diffusion layers 302 into normal product or abnormal product on the basis of the data transmitted from the first vision sensor 140 and the second vision sensor 155. In step S652, abnormal products are loaded into the abnormal product magazine 175.

In step S660, the adsorbing-conveying device 135 moves to the stationery magazine 170 with the gas diffusion layers 302 attached thereto and adsorbs stationery 171 under the gas diffusion layers 302.

That is, the adsorbing-conveying device 135 adsorbs the gas diffusion layers 302 and stationery 171 together. Then, in step S670, the adsorbing-conveying device 135 moves to the normal product magazine 165 and loads the stationery 171 and the gas diffusion layers 302 together.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A gas diffusion layer (GDL) cutting system for a fuel cell, comprising:

a laser-cutting device configured to radiate a laser on the surface of a GDL fabric panel moving on a conveyer to form cut gas diffusion layers;

an adsorbing-conveying device comprising an adsorbing surface of the adsorbing-conveying device in contact with upper surfaces of the cut gas diffusion layers, and the adsorbing-conveying device and the adsorbing-conveying device configured to adsorb the upper surfaces of the cut gas diffusion layers and to separate the cut gas diffusion layers from the GDL fabric panel by moving up;

a first vision sensor configured to sense the upper surfaces of the cut gas diffusion layers;

a second vision sensor configured to sense lower surfaces of the cut gas diffusion layers adsorbed and conveyed by the adsorbing-conveying device;

a controller configured to determine whether shapes of the cut gas diffusion layers are normal or abnormal according to image signals transmitted from at least one of the first vision sensor or the second vision sensor, wherein the cut gas diffusion layers determined to be normal when the cut gas diffusion layers are formed in a predetermined shape and the cut gas diffusion layers determined to be abnormal when the cut gas diffusion layers are different from the predetermined shape;

a first product magazine into which first products of the cut gas diffusion layers determined to be normal by the controller are loaded;

a second product magazine into which second products of the cut gas diffusion layers determined to be abnormal by the controller are loaded;

a stationery magazine into which stationery to be disposed under the cut gas diffusion layers is loaded; and the adsorbing-conveying device moves a predetermined distance with the GDL fabric panel at the same speed on the conveyer, wherein the adsorbing-conveying device is further configured to move to the stationery magazine, adsorb the upper surfaces of the cut gas diffusion layers and the stationery together, move to the first product magazine, and load the cut gas diffusion layers and the stationery together in the first product magazine.

2. The system of claim 1, further comprising:
a scrap basket disposed at an exit of the conveyer and collecting scraps of the cut gas diffusion layers separated from the GDL fabric panel.

3. The system of claim 1, further comprising:
a fabric panel unwinder on which the GDL fabric panel is rolled and that is disposed ahead of the conveyer;
a feeding device that continuously supplies the GDL fabric panel rolled on the fabric panel unwinder to an inlet of the conveyer by pulling the GDL fabric panel; and
a fabric panel-connecting device disposed between the fabric panel unwinder and the feeding device and connecting a new GDL fabric panel to a previous GDL fabric panel.

4. The system of claim 3, wherein:
the fabric panel-connecting device further includes:
a first holder disposed to hold the rear end of the previous GDL fabric panel;
a second holder disposed to hold the front end of the new GDL fabric panel; and
holder actuators that operate the first and second holders so that the first and second holders fix the previous GDL fabric panel and the new GDL fabric panel.

5. The system of claim 1, further comprising:
a dirt pan disposed to collect dirt dropping under the conveyer from the GDL fabric panel; and
a particle suction device disposed at the exit of the conveyer and filtering granular dirt.

6. The system of claim 1, wherein:
the laser-cutting device includes:
a laser head including a laser that radiates in a predetermined shape; and
an air-spraying nozzle disposed to one side of the laser head and removing dirt by spraying air on the surface of the GDL fabric panel.

* * * * *